United States Patent [19]

Chou

[11] Patent Number: 5,924,342
[45] Date of Patent: Jul. 20, 1999

[54] OIL FILTER WRENCH

[76] Inventor: Joseph M. Chou, 5405 Encinita Ave., Temple City, Calif. 91780

[21] Appl. No.: 08/856,742

[22] Filed: May 15, 1997

[51] Int. Cl.⁶ .................................................... B25B 13/06
[52] U.S. Cl. ............................ 81/120; 81/121.1; 81/125; 81/3.4
[58] Field of Search ........................... 81/3.4, 3.36, 3.08, 81/3.29, 441, 64, 120, 121.1, 125, 53.2; 7/100

[56] References Cited

U.S. PATENT DOCUMENTS

| 2,930,267 | 3/1960 | Apicelli | 81/125 X |
| 3,005,367 | 10/1961 | Vose | 81/125 |
| 3,853,026 | 12/1974 | Rhodes | 81/64 |
| 4,266,452 | 5/1981 | Crist | 81/121.1 |
| 4,865,727 | 9/1989 | Krauss | 81/121.1 |
| 5,271,299 | 12/1993 | Wadsworth | 81/121.1 |

FOREIGN PATENT DOCUMENTS 646323  11/1950  United Kingdom ..................... 81/125

*Primary Examiner*—D. S. Meislin
*Attorney, Agent, or Firm*—David and Raymond; Raymond Y. Chan

[57] ABSTRACT

An oil filter wrench for easily unscrew an oil filter from a vehicle or machinery includes a hollow wrench body which has a receiving opening provided at a top end thereof, an inner round base wall provided above a bottom end thereof, and a supporting base provided at the bottom end thereof, so as to define an interior chamber between the top end and the bottom end of the wrench body for receiving a lower portion of an oil filter therein through the receiving opening. The oil filter wrench further includes a locking device provided on the base wall for interlocking with a circular bottom edge of the oil filter when the oil filter wrench is turned in a unscrewing direction, a holding device mounted on the top end for gripping on a round body of the oil filter so as to ensure the oil filter wrench mounting on the oil filter, and a driving device integrally provided on the supporting base for driving the wrench body to rotate, in order to unlock and unscrew the oil filter by means of the locking device.

16 Claims, 6 Drawing Sheets

OIL FILTER WRENCH

FIELD OF THE PRESENT INVENTION

The present invention relates to oil filter removing tools for vehicle, and more particularly to an oil filter wrench which can turn to unscrew the oil filter easily under all kinds of condition, even though the oil filter surface is slippery due to oil leakage or the connecting screw hole of the oil filter is tightly interlocked with the oil filter connecting head under the vehicle engine due to rusting, engine sediment, decayed or worn out screw threads, or other reasons.

BACKGROUND OF THE PRESENT INVENTION

After the industry revolution, heavy machinery products greatly improve the life of human being. The automobile industry is also blooming after the first vehicle was produced. In the present days, almost every family owns at least a vehicle in the United States. Most families even have more than one vehicle for each family member over 16 years of age.

All of the machinery and vehicle's engine, need to periodically maintain in order to keep them in the best condition. One of the most basic maintaining necessity needed to perform for all machinery and automobiles is to have the oil change periodically. It is because the lubricating oil within the machinery or engine plays a very important role of preventing the engine parts from rubbing with each other that may cause serious damage thereto. Moreover, in order to prolong the service life span of lubricating oil or motor oil, the most popular arrangement is to install an oil filter to the oil tank of the machinery or engine for filtering the engine sediment, particles and dust carried in the lubricating oil when it is flowing through the oil filter.

For automobile, we need to have oil change for every three thousand miles and replace the oil filter for every six thousand miles regardless the age of the automobile. The oil change process is simple enough that almost anybody can do, but the replacement of the oil filter suffers many drivers or even mechanics.

It is well known that the engine and the oil filter installed thereto filter are at extremely high temperature during or after driving. When the driver or the mechanist tries to grip on the small oil filter with a conventional oil filter wrench and to turn the oil filter, his or her hands may easily get burned by the hot oil filter or the engine parts surrounding the oil filter during the unscrewing process if caution is not implement. Otherwise, the driver or the mechanist has to wait for a long period of time, approximately half an hour, until the whole engine is cool down to normal temperature before he or she can process the oil filter replacement operation safely.

Most vehicles don't provide much room under the hood, especially the small family vehicle. There is very little room for the mechanist to work with the conventional oil filter wrench without getting their hands burnt. Moreover, since the vehicle engine is so tightly constructed, there is no room for the mechanist to operate the conventional oil filter wrench and to put force into the twisting motion that makes some oil filters very difficult to replace.

The convention wrench for unscrewing the oil filter has the tendency to slip off the oil filter when the filter is tightly screwed on. Also when the oil filter has grease thereon or has the problem of oil leakage, it will increase the chance for the conventional wrench to slip off and thus increasing the difficulty of the replacement of the oil filter. When this situation happen, hands of the driver or mechanist may slip and hit on the surrounding engine parts that may cause a painful and harmful experience.

As the age and the mileage of an automobile increases, the difficulty of unscrewing the oil filter from the oil tank of the engine also increases because there may have more sediment inside the engine. Furthermore, the screw threads of the oil filter connecting head may have been decayed or worn out over the years. Frequently, the connecting screw hole of the oil filter may be tightly interlocked with the oil filter connecting head of the oil tank under the engine due to rusting, engine sediment, decayed or worn out screw threads, or other reasons.

Most mechanists have terrible experience that once the connecting screw hole of the oil filter is tightly interlocked with the oil filter connecting head of the engine oil tank, it is extremely difficult to unlock the oil filter. Under such situation and due to the limited room provided and the slippery surface of the oil filter, most conventional oil filter wrenches do not work. Some mechanists even try to punch a screwdriver or other sharpened rod into the oil filter attempting to unscrew the oil filter by turning the screwdriver or sharpened rod. It not only is dangerous and time consuming, but also may cause damage to the oil filter connecting head of the engine oil tank. Sometimes, even the oil filter body is totally destroyed by the mechanists, the oil filter is still firmly connected to the engine oil tank.

SUMMARY OF THE PRESENT INVENTION

It is a main objective of the present invention to provide an oil filter wrench which can firmly interlock with the oil filter and being turned to unscrew the oil filter easily under all kinds of condition, even though the oil filter surface is slippery due to oil leakage or the connecting screw hole of the oil filter is tightly secured with the oil filter connecting head of the vehicle engine or machinery.

It is another objective of the present invention to provide an oil filter wrench, wherein the user can easily attach the oil filter wrench to the oil filter without his or her hands in contact with the hot and dirty oil filter.

It is still another objective of the present invention to provide an oil filter wrench, wherein after the oil filter is unscrewed, the oil filter can still be gripped by the oil filter wrench of the present invention for removing from the vehicle engine or machinery, so that the user can avoid his or her hands in contact with the oil filter.

It is yet another objective of the present invention to provide an oil filter wrench which is economically competitive and has an one size fitting most features.

Accordingly, in order to achieve the above objectives, the present invention provides an oil filter wrench comprising a hollow wrench body which has a receiving opening provided at a top end thereof, an inner round base wall provided above a bottom end thereof, and a supporting base provided at the bottom end thereof, so as to define an interior chamber between the top end and the bottom end of the wrench body for receiving a lower portion of an oil filter therein through the receiving opening. The oil filter wrench further comprises a locking device provided on the base wall for interlocking with a circular bottom edge of the oil filter when the oil filter wrench is turned in a unscrewing direction, a holding device mounted on the top end for gripping on a round body of the oil filter so as to ensure the oil filter wrench mounting on the oil filter, and a driving device integrally provided on the supporting base for driving the wrench body to rotate.

The locking device comprises at least four identical triangular locking blades protruded and spaced intervally from the base wall to the interior chamber of the wrench body in evenly and circularly spaced manner. Each locking blade is extended from the base wall towards another adjacent locking blade in clockwise direction and has an engaging edge extending inclinedly and inwardly towards the bottom end of the wrench body. Therefore, when the oil filter is received in the interior chamber of the wrench body, the circular bottom edge of the oil filter is rested on the four engaging edges of the four locking blades. The four engaging edges will bite into the bottom edge of the oil filter while the wrench body is rotated in a direction to unscrew the oil filter, so as to enable the oil filter wrench interlocking with the oil filter during unscrewing rotation.

The holding device comprises at least two clipping guiders intervally extending upwardly from the top end of the wrench body for guiding the wrench body to mount on the oil filter and holding the wrench body in position by clipping on the round body of the oil filter. After the oil filter is unscrewed from a vehicle engine or machinery, the two clipping guiders keep holding the oil filter in the wrench body, so that the user can remove the oil filter from the vehicle engine or machinery by holding the wrench body for avoiding his or her hand directly in contact with the oil filter.

The driving device comprises a hexagonal head protruding downwardly and coaxially from the supporting base for enabling a corresponding hexagonal socket wrench mounted thereon, so that the user may rotate the wrench body by turning the hexagonal socket wrench. The hexagonal head also provides a central square socket to enable a connecting square head of a universal socket wrench inserted therein, so that the user may also selectively rotate the wrench body of the oil filter wrench of the present invention by turning the universal socket wrench.

DETAILED DESCRIPTION OF THE PREFERRED EMBODIMENT

Figure 1:
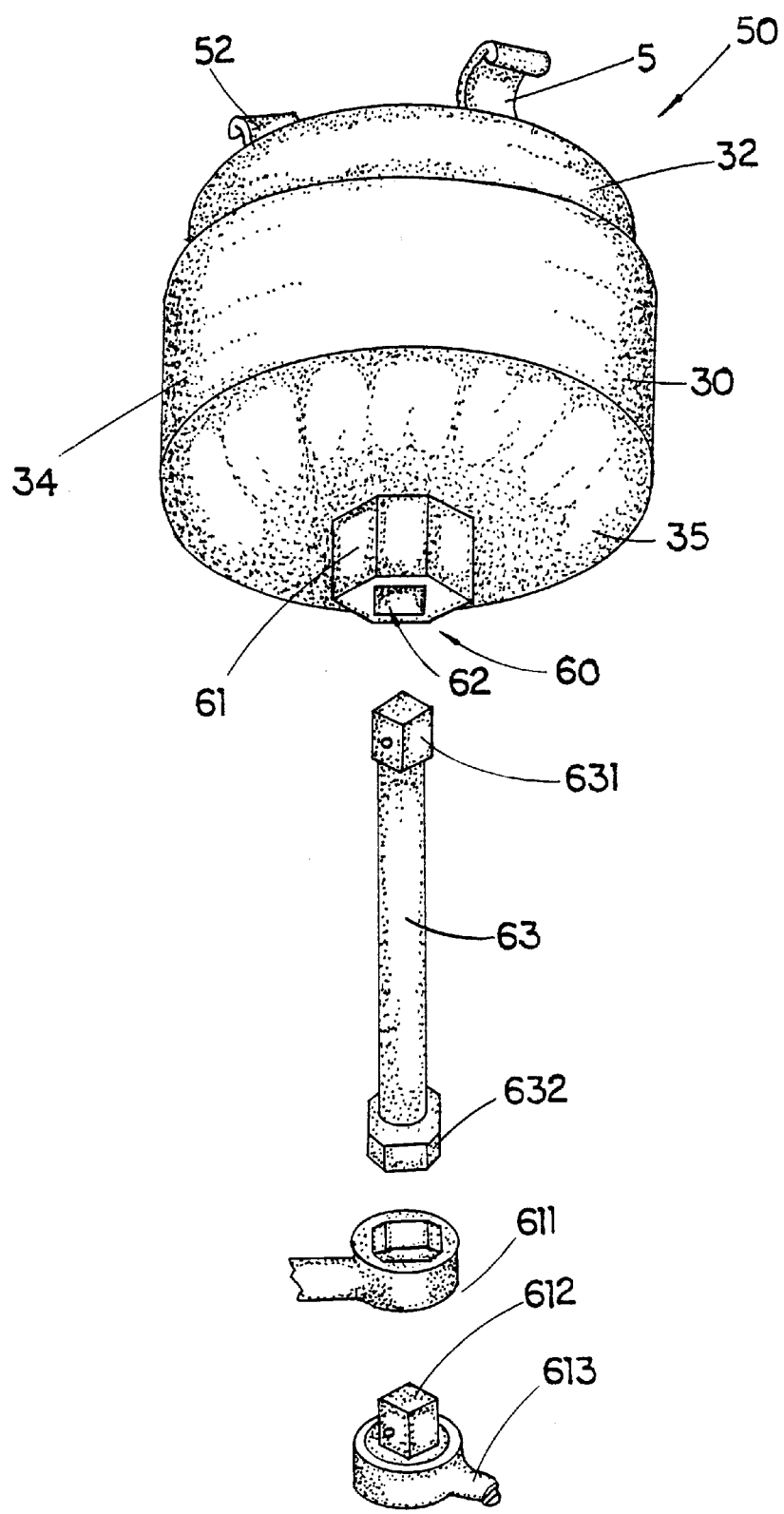
FIG. 1 is a perspective view of an oil filter wrench according to a first preferred embodiment of the present invention.

Referring to FIGS. 1, 2, 3A and 3B of the drawing, an oil filter wrench 10 according to a first preferred embodiment of the present invention is illustrated. The oil filter wrench 10, which is specifically adapted to used for easily unscrew an oil filter 20 from a vehicle engine or a machinery, comprises a hollow wrench body 30 for receiving a lower portion 21 of the oil filter 20, a locking device 40 for interlocking with a circular bottom edge 22 of the oil filter 20 when the oil filter wrench 10 is turned in a unscrewing direction, a holding device 50 for gripping on a round body 23 of the oil filter 20 so as to ensure the oil filter wrench 10 mounting on the oil filter 20, and a driving device 60 for driving the wrench body 30 to rotate.

Figure 2:
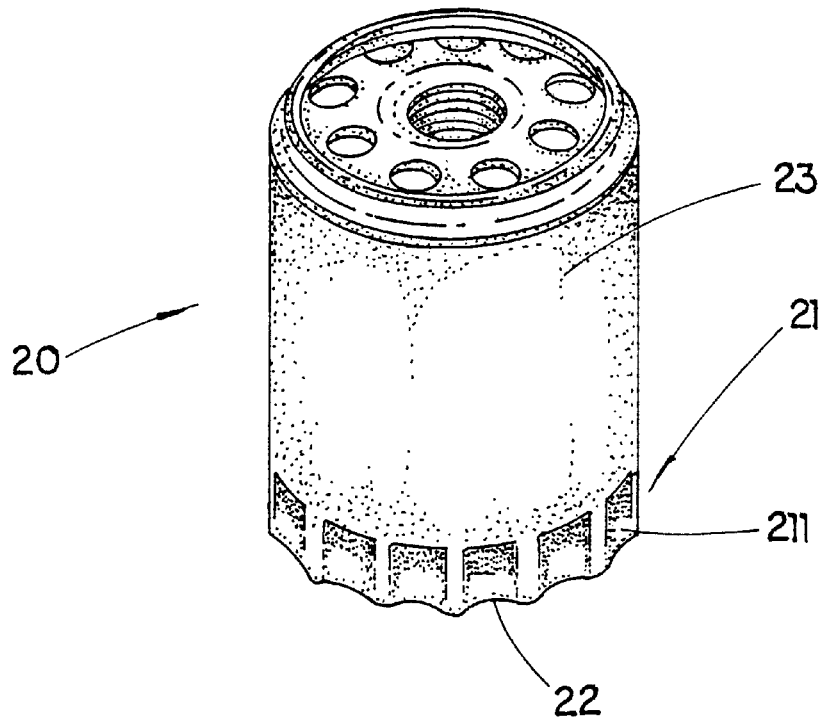
FIG. 2 is a section perspective view of the oil filter wrench according to the above first preferred embodiment of the present invention.
Figure 2:
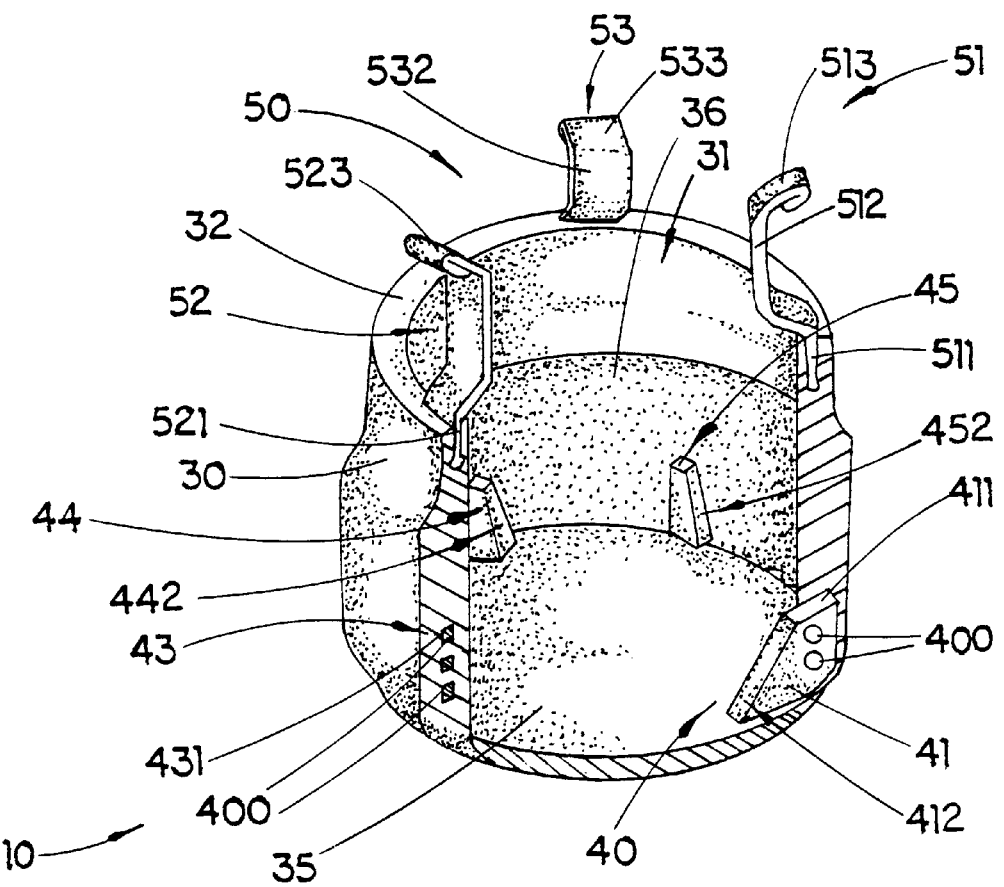
Figure 3A:
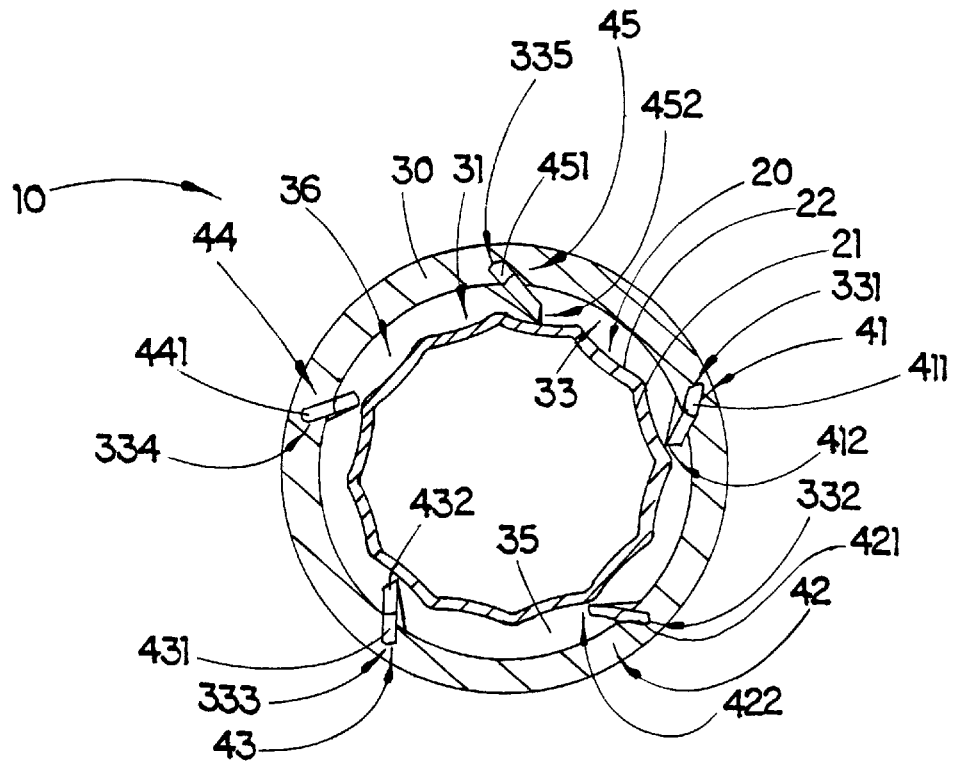
FIG. 3A is a sectional view of the oil filter wrench according to the above first preferred embodiment of the present invention, illustrating how the locking device of the oil filter wrench interlocking with the oil filter.

The wrench body 30 has a circular receiving opening 31 provided at a top end 32 thereof, an inner round base wall 33 provided above a bottom end 34 thereof, and a supporting base 35 provided at the bottom end 34 thereof, so as to define an interior chamber 36 between the top end 32 and the bottom end 34 of the wrench body 30 for receiving the lower portion 21 of the oil filter 20 therein through the receiving opening 31, as shown in FIGS. 2 and 3A. The supporting base 35 has a concave inner surface 351, as shown in FIG. 2, to fit the convex bottom of the oil filter 20.

In accordance with the present embodiment, the wrench body 30 is in hollow cylindrical body made of durable metal such as aluminum alloy and having a predetermined height substantially equal to or less than a half height of the oil filter 20. The supporting base 35 is a concave bottom wall of the wrench body 30. The interior chamber 36 is a circular chamber having a diameter larger than the oil filter 20.

The locking device 40 comprises at least four, preferable five according to the present embodiment, steel made triangular locking blades 41, 42, 43, 44, 45 intervally protruded from the base wall 33 to the interior chamber 36 of the wrench body 30 in evenly and circularly spaced manner. The base wall 33 provides five evenly and circularly spaced longitudinal engaging grooves 331, 332, 333, 334, 335 in angularly manner, as shown in FIG. 3A. Each of the locking blades 41 to 45 has an identical configuration and comprises a mounting tail 411, 421, 431, 441, 451 extended outwardly to rigidly and firmly engage in the respective engaging groove 331 to 335. Practically, each of the mounting tails 411 to 451 of each locking blade 41 to 45 further provides at least a lateral engaging hole 400 for the constructive material of the wrench body 30 to fill through during molding, so as to integrally and rigidly secure the locking blades 41 to 45 in position, as shown in FIG. 2. Of course, the five locking blades 41 to 45 can also be integrally protruded from the base wall 33.

Each of the locking blades 41 to 45 is substantially extended from the base wall 33 towards another adjacent locking blade 41 to 45 in clockwise direction and has a tapered and angular engaging edge 412, 422, 432, 442, 452 extending inclinedly and inwardly towards the bottom end 34 of the wrench body 30. In other words, the locking blade 41 is extended inclinedly towards the adjacent locking blade 42 which is similarly extended inclinedly towards the adjacent locking blade 43, as shown in FIGS. 2 and 3A.

Therefore, when the oil filter 20 is received in the interior chamber 36 of the wrench body 30, the circular bottom edge 22 of the oil filter 20 is rested on the five engaging edges 412 to 452 of the four locking blades 41 to 45, as shown in FIG. 3A. The five engaging edges 412 to 452 would respectively bite into the bottom edge 22 of the oil filter 20 while the wrench body 30 is rotated in a direction to unscrew the oil filter 20, so as to ensure the oil filter wrench 10 being interlocked with the oil filter 20 during unscrewing rotation.

In accordance with the present invention, the oil filter wrench 10 of the present invention may fit various sizes of different oil filters, in which the bottom edge of an oil filter having a smaller diameter will rest on an upper position of each engaging edge 412 to 452 of each the locking blade 41 to 45. For an oil filter having a larger diameter, the bottom edge thereof may rest on a lower position of each engaging edge 412 to 452 of each the locking blade 41 to 45.

The holding device 50 comprises at least two, preferable three, clipping guiders 51, 52, 53 intervally extending upwardly from the top end 32 of the wrench body 30 for guiding the wrench body 30 to mount on the oil filter 20 and holding the wrench body 30 in position by clipping on the round body 23 of the oil filter 20.

Figure 3B:
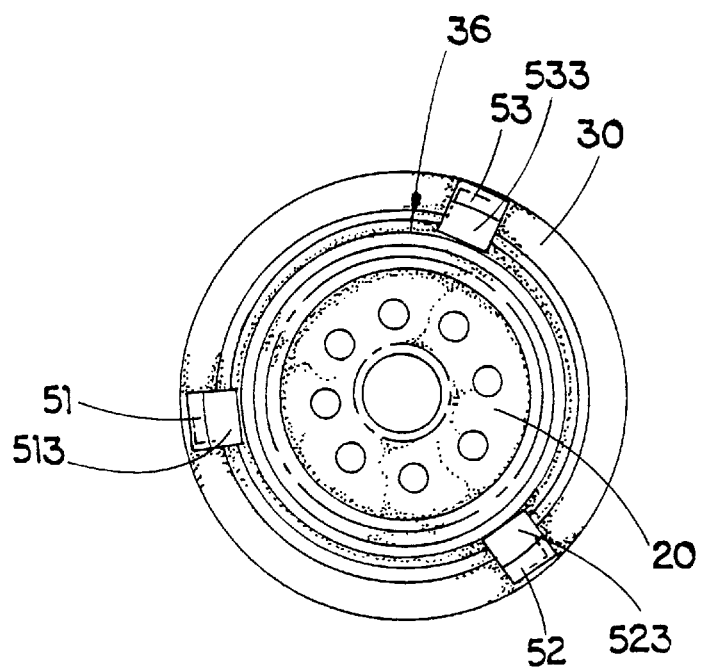
FIG. 3B is a plan view of the oil filter wrench according to the above first preferred embodiment of the present invention, illustrating how the holding device of the oil filter wrench holding an oil filter in position.

Referring to FIG. 2, each of the clipping guiders 51 to 53 is an elastic strip such as spring strip, which comprises a vertical bottom portion 511, 521, 531 integrally implanted within the top end 32 of the wrench body 30, as shown in FIG. 2, and a clipping portion 512, 522, 532 extending upwardly from the bottom portion 511, 521, 531 and bending inwardly towards the center of the wrench body 30, a guiding portion 513, 523, 533 extending upwardly, outwardly and inclinedly from the clipping portion, wherein an inner space defined between the three clipping portions 512, 522, 532 should be slightly smaller than the diameter of an oil filter having a smallest fitting size with respect to the wrench body 30 and the locking device 40 of the oil filter wrench 10. Therefore, as shown in FIG. 3B, when the oil filter 20 is inserted into the interior chamber 36 of the wrench body 30, the three clipping guiders 51, 52, 53 will be propped up by the oil filter 20, so that three clipping portions 512, 522, 533 are oppositely pressed and clipped on the round body 23 of the oil filter 20 in order to firmly hold the oil filter 20 in position.

The three guiding portions 513, 523, 533 of the three clipping guiders 51, 52, 53 also provide a guiding effect when the user try to mount the oil filter wrench 10 on the oil filter 20. During operation, firstly the three upwardly and outwardly inclined guiding portions 513, 523, 533 can generally rest on the bottom edge 22 of the oil filter 20, and then the user may simply push the wrench body 30 upwards, so that the three guiding portions 513, 523, 533 of the three clipping guiders 51, 52, 53 will guide the lower portion 21 of the oil filter 20 inserting into the interior chamber 36 of the wrench body 30.

Referring to FIG. 1, the driving device 60 comprises a hexagonal head 61 protruding downwardly and coaxially from the supporting base 35 for enabling a corresponding hexagonal socket wrench 611 mounted thereon, so that the user may rotate the wrench body 30 to unlock and unscrew the oil filter 20 simply by turning the hexagonal socket wrench. The hexagonal head 60 also provides a central square socket 62 to enable a connecting square head 612 of a universal socket wrench 613 inserted therein, so that the user may also selectively rotate the wrench body 30 of the oil filter wrench 10 of the present invention to unlock and unscrew the oil filter 20 by turning the universal socket wrench. The square socket 62 is specially useful when there is very limited room present around the oil filter 20, wherein the square socket 62 can be incorporated with an extension rod 63 which has a square 631 and a hexagon head 632 provided at two ends thereof respectively. The user may simply insert the square head 631 of the extension rod 63 into the square socket 62 and rotate the hexagon head 632 of the extension rod 63 by the hexagonal socket wrench 611 for unlocking and unscrewing the oil filter 20.

According to the present invention, the oil filter wrench 10 can be easily mounted on the oil filter through the guiding of the three clipping guiders 51, 52, 53 of the holding device 50 and firmly held in position by means of the holding device 50. After the oil filter is unlocked, the oil filter 20 can be easily unscrewed from a vehicle engine or machinery by rotating the wrench body 30. Moreover, the three clipping guiders 51, 52, 53 can keep holding the oil filter 20 in the wrench body 30, so that the user can remove the oil filter 20 from the vehicle engine or machinery by holding the wrench body 30 for avoiding his or her hand directly in contact with hot and dirty the oil filter 20.

Since the user does not need to use his or her hand directly in contact with the oil filter 20 throughout the entire operation, the user can replace the oil filter even when the engine is still in hot condition after driving and save the time for waiting the engine to cool down.

Since the lower portion 21 of the every oil filter 20 provides a plurality of reinforced stepped layer 211 and the bending bottom edge 22 of the oil filter 20 is the strongest and hardest portion of the oil filter 20, therefore no matter how tight is the oil filter 20 screwed to the engine or machinery or how slippery is the body surface of the oil filter 20, the five locking blades 41 to 45 of the locking device 40 can ensure the wrench body 30 firmly engaged with the oil filter 20 by propping the five engaging edges 412 to 452 tangentially against the bottom edge 22 of the oil filter 20. The stepped layer 211 can also prevent the five engaging edges 412 to 415 to slip off. In fact, when the wrench body 30 is rotated in the unscrewing direction, i.e. the clockwise direction when viewing in FIG. 3A, the five engaging edges 412 to 415 may bite into the bottom edge 22 of the oil filter 20 to firmly interlock the five locking blades 41 to 45 with the oil filter 20, so that by rotating the wrench body 30, the oil filter 20 can certainly be unlocked and detached from the engine or machinery.

Figure 4:
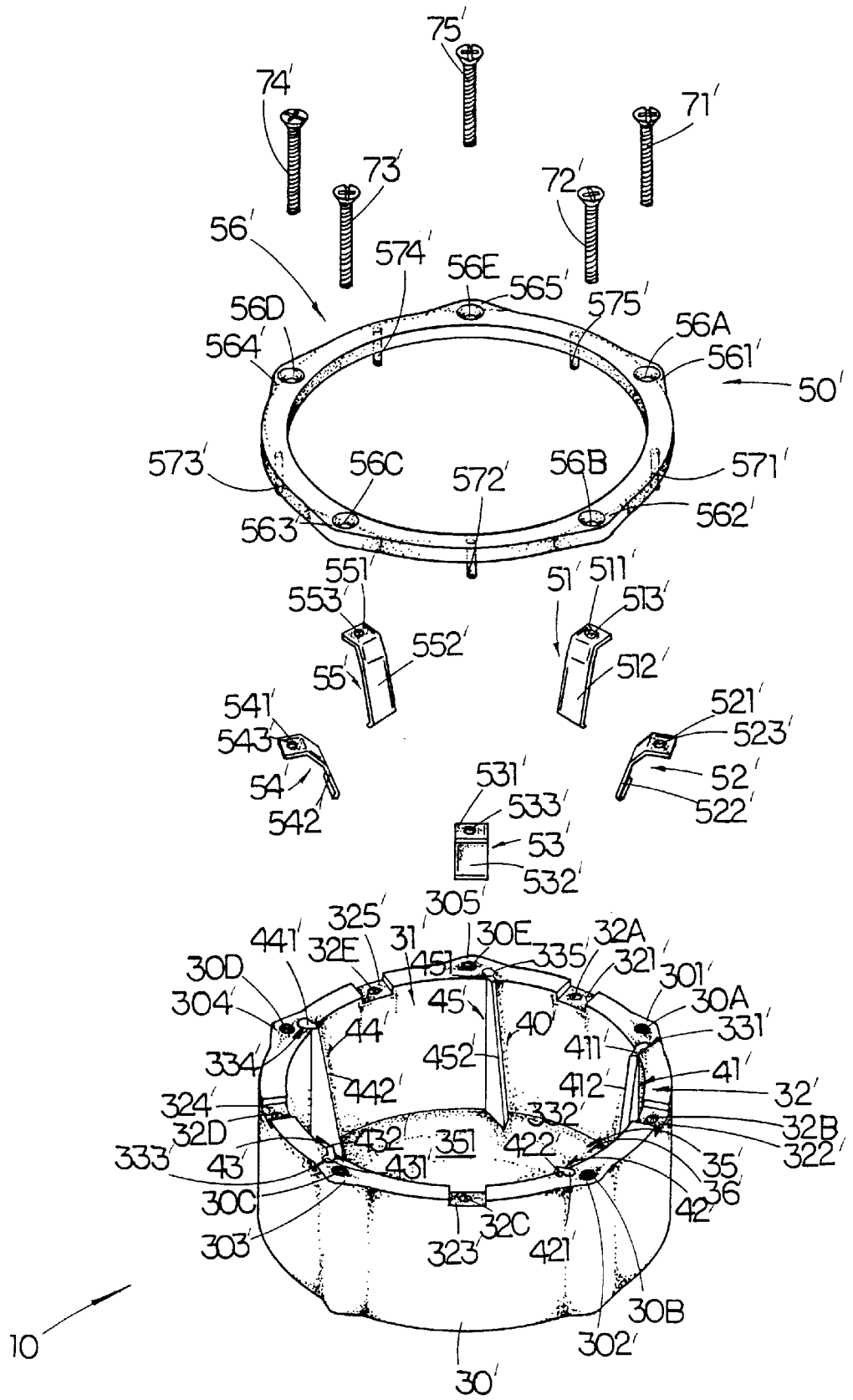
FIG. 4 is an exploded perspective view of the oil filter wrench according to a second preferred embodiment of the present invention.
Figure 6:
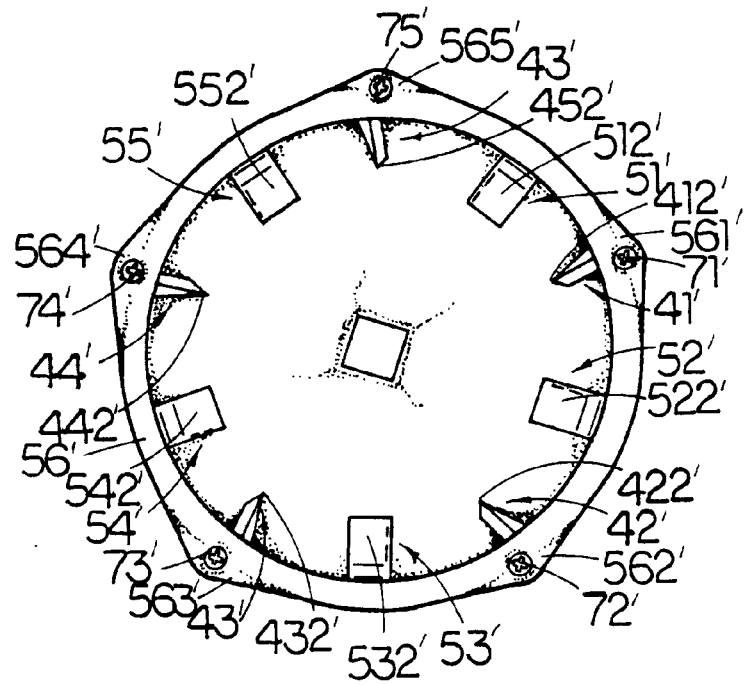
FIG. 6 is a plan view of the oil filter wrench according to the above second preferred embodiment of the present invention, illustrating how various sizes of different oil filters fitting with the oil filter wrench.
Figure 5:
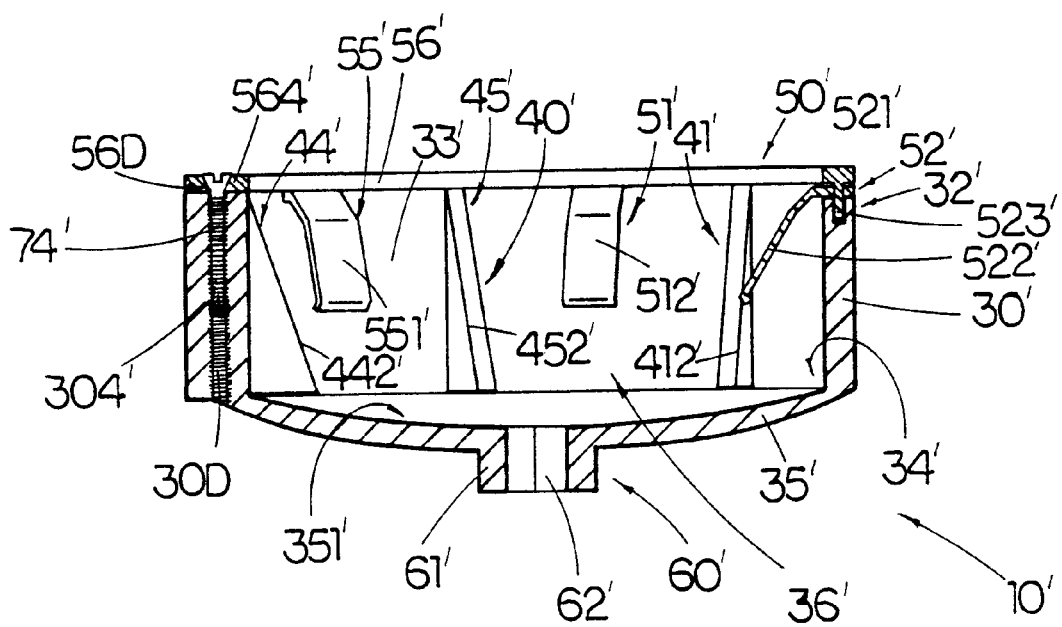
FIG. 5 is a sectional end view of the oil filter wrench according to the above second preferred embodiment of the present invention.

Referring to FIGS. 4 to 6, a second preferred embodiment of the oil filter wrench 10' is illustrated, which has similar configuration as the above first preferred embodiment and comprises a hollow wrench body 30' for receiving the lower portion 21 of the oil filter 20, a locking device 40' for interlocking with the circular bottom edge 22 of the oil filter 20 when the oil filter wrench 10 is rotated in a unscrewing direction, a holding device 50' for gripping on the round body 23 of the oil filter 20 so as to ensure the oil filter wrench 10' mounting on the oil filter 20, and a driving device 60' for driving the wrench body 30' to rotate.

The second preferred embodiment basically is an alternative mode of the first preferred embodiment to illustrate a possible modification thereof The wrench body 30', similar to the above first embodiment, also has a circular receiving opening 31' provided at a top end 32' thereof, an inner round base wall 33' provided above a bottom end 34' thereof, and a supporting base 35' provided at the bottom end 34' thereof, so as to define an interior chamber 36' between the top end 32' and the bottom end 34' of the wrench body 30' for receiving the lower portion 21 of the oil filter 20 therein through the receiving opening 31', as shown in FIGS. 4 and 6. The supporting base 35' has a concave inner surface 351' to fit the convex bottom of the oil filter 20.

In accordance with the second preferred embodiment, the wrench body 30 is in hollow cylindrical body made of durable metal such as aluminum alloy and having a predetermined height substantially equal to or higher than the lower portion 21 of the oil filter 20. The supporting base 35' is a concave bottom wall of the wrench body 30'. The interior chamber 36' is a circular chamber having a diameter larger than the oil filter 20.

The locking device 40' comprises at least four, preferable five according to the second preferred embodiment, steel made triangular locking blades 41', 42', 43', 44', 45' intervally protruded from the base wall 33' to the interior chamber 36' of the wrench body 30' in evenly and circularly spaced manner. According to the second preferred embodiment, in order to affixed the five locking blades 41' to 45', the base wall 33' of the wrench body 30' provides five evenly and circularly spaced longitudinal engaging grooves 331' 332', 333', 334', 335' in angularly manner, as shown in FIG. 4, wherein each engaging groove 331' to 335' is approximately inclined with a radially axle for 15 degrees. With respect to the positions of the five engaging grooves 331' to 335', the wrench body 30' provides five outwardly and axially extending body projections 301', 302', 303', 304', 305' to thicken the thickness of the wrench body 30' so as to reinforce the five engaging grooves 331' to 335'. Five axial screw holes 30a, 30b, 30c, 30d, 30e are provided on the five body projections 301' to 305' respectively.

In between each two adjacent engaging grooves 331' to 335', a holding recess 321', 322', 323', 324', 325' is formed on the top end 32' of the wrench body 30'. Five axial affixing holes 32a, 32b, 32c, 32d, 32e with a predetermined depth are formed on the five holding recesses 321' to 325' respectively.

Each of the locking blades 41' to 45' has an identical configuration and comprises an enlarged mounting tail 411', 421', 431', 441', 451' extended outwardly fittedly engage in the respective engaging groove 331' to 335'. Therefore, each of the locking blades 41' to 45' is substantially extended from the base wall 33' towards another adjacent locking blade 41' to 45' in clockwise direction and has a tapered and angular engaging edge 412', 422', 432' 442', 452' extending inclinedly and inwardly towards the bottom end 34' of the wrench body 30', as shown in FIG. 6. In other words, the locking blade 44' is extended inclinedly towards the adjacent locking blade 45' which is similarly extended inclinedly towards the adjacent locking blade 41', as shown in FIGS. 4 and 6.

Accordingly, when the oil filter 20 is received in the interior chamber 36' of the wrench body 30', the circular bottom edge 22 of the oil filter 20 is rested on the five engaging edges 412' to 452' of the four locking blades 41' to 45', as shown in FIGS. 4 and 6. The five engaging edges 412' to 452' would respectively bite into the bottom edge 22 of the oil filter 20 while the wrench body 30' is rotated in a direction to unscrew the oil filter 20, so as to ensure the oil filter wrench 10' being interlocked with the oil filter 20 during unscrewing rotation.

Same as the above first embodiment, the oil filter wrench 10' disclosed in the second preferred embodiment may also fit various sizes of different oil filters, in which the bottom edge of an oil filter having a smaller diameter will rest on an upper position of each engaging edge 412' to 452' of each the locking blade 41' to 45'. For an oil filter having a larger diameter, the bottom edge thereof may rest on a lower position of each engaging edge 412' to 452' of each the locking blade 41' to 45'.

In accordance with the second preferred embodiment, the holding device 50' comprises five clipping guiders 51', 52', 53', 54', 55' and a ring shaped holder 56'. Each clipping guider 51' to 55' has a retaining shoulder 511', 521', 531', 541', 551' and a clipper element 512', 522', 532', 542', 552' extended inwardly and downwardly from the respective retaining shoulder 511' to 551' respectively. Each retaining shoulder 511' to 551' provides a retaining hole 513', 523', 533', 543', 553' thereon. The holder 56' has a diameter equal to the diameter of the top end 32' of the wrench body 30. With respect to the five body projections 301' to 305' of the wrench body 30', the holder 56' also provides five securing wings 561', 562', 563', 564', 565' evenly and spacedly protruded from an outer periphery of the holder 56'. Each securing wing 561' to 565' has a countersink hole 56a, 56b, 56c, 56d, 56e provided thereon. With respect to the five affixing holes 32', the holder 56' has five affixing plugs 571', 572', 573', 574', 575' integrally extending downwards from a bottom surface thereof and positioning in between each two adjacent securing wings 561' to 565' respectively.

By means of the holder 56', the five locking blades 41' to 45' and the five clipping guiders 51' to 55' can be firmly and securely held in position. The assembly operation of the oil filter wrench 10' according to the second preferred embodiment is easy and fast. Firstly, position the five retaining shoulders 511' to 551' of the five clipping guiders 51' to 55' fittedly in the five holding recesses 321' to 325' respectively and align the five retaining holes 513' to 553' of the five cipping guiders 51' to 55' with the five affixing holes 32a to 32e provided on the five holding recesses 321' to 325' respectively, wherein the five clipper elements 512' to 552' are positioned to extend inwardly and downwardly inside the interior chamber 36'. Then, mount the holder 56' on top of the wrench body 30' until the five affixing plugs 571' to 575' are inserted through the five retaining holes 513' to 553' into the five affixing holes 32a to 32e respectively in order to firmly hold the five clipping guiders 51' to 55' in position. Five securing screws 71', 72', 73', 74', 75' are screwed through the five countersink holes 56a to 56e of the holder 56' into the five screw holes 30a to 30e provided on the five body projections 301' to 305 of the wrench body 30' respectively, so that the holder 56' is downwardly and firmly secured to the top end 32' of the wrench body 30' for pressing and retaining the five clipping guiders 51' to 55' in position and the five locking blades 41' to 45' within the five engaging grooves 331' to 335' respectively.

Referring to FIG. 4, each of the clipping guiders 51' to 55' is an elastic strip such as spring strip extended downwardly and inwardly within the interior chamber 36', wherein an inner space defined between the five clipper elements 512' to 522' should be slightly smaller than the diameter of an oil filter 20 having a smallest fitting size with respect to the wrench body 30' of the oil filter wrench 10. Therefore, when the oil filter 20 is inserted into the interior chamber 36' of the wrench body 30', the five clipping guiders 51' to 55' will be propped up outwardly by the oil filter 20, so that the five clipper elements 512' to 552' are oppositely pressed and clipped on the round body 23 of the oil filter 20 in order to firmly hold the oil filter 20 in position.

Similarly, the five clipper elements 512' to 552' of the five clipping guiders 51' to 55' also provide a guiding effect when the user try to mount the oil filter wrench 10' on the oil filter 20. During operation, firstly the five downwardly and inwardly inclined clipper elements 512' to 552' can generally rest on the bottom edge 22 of the oil filter 20, and then the user may simply push the wrench body 30' upwards, so that the five clipper elements 512' to 552' of the five clipping guiders 51' to 55' will guide the lower portion 21 of the oil filter 20 inserting into the interior chamber 36' of the wrench body 30'.

Referring to FIG. 5, the driving device 60' has an identical configuration as that in the above first preferred embodiment, comprising a hexagonal head 61' protruding downwardly and coaxially from the supporting base 35' for enabling a corresponding hexagonal socket wrench mounted thereon, so that the user may rotate the wrench body to unlock and unscrew the oil filter simply by turning the hexagonal socket wrench. The hexagonal head 60' also provides a central square socket 62' to enable a connecting square head of a universal socket wrench inserted therein, so that the user may also selectively rotate the wrench body 30' of the oil filter wrench 10' of the present invention to unlock and unscrew the oil filter by turning the universal socket wrench.

The oil filter wrench 10' illustrated in the second preferred embodiment may also fit various sizes of different oil filters. As shown in FIG. 6, the two circular dotted-lines illustrates the bottom edges of two oil filters having different diameters, wherein both oil filters are rested on an upper position and a lower position of each engaging edge 412' to 452' of each the locking blade 41' to 45' respectively.

Figure 7:
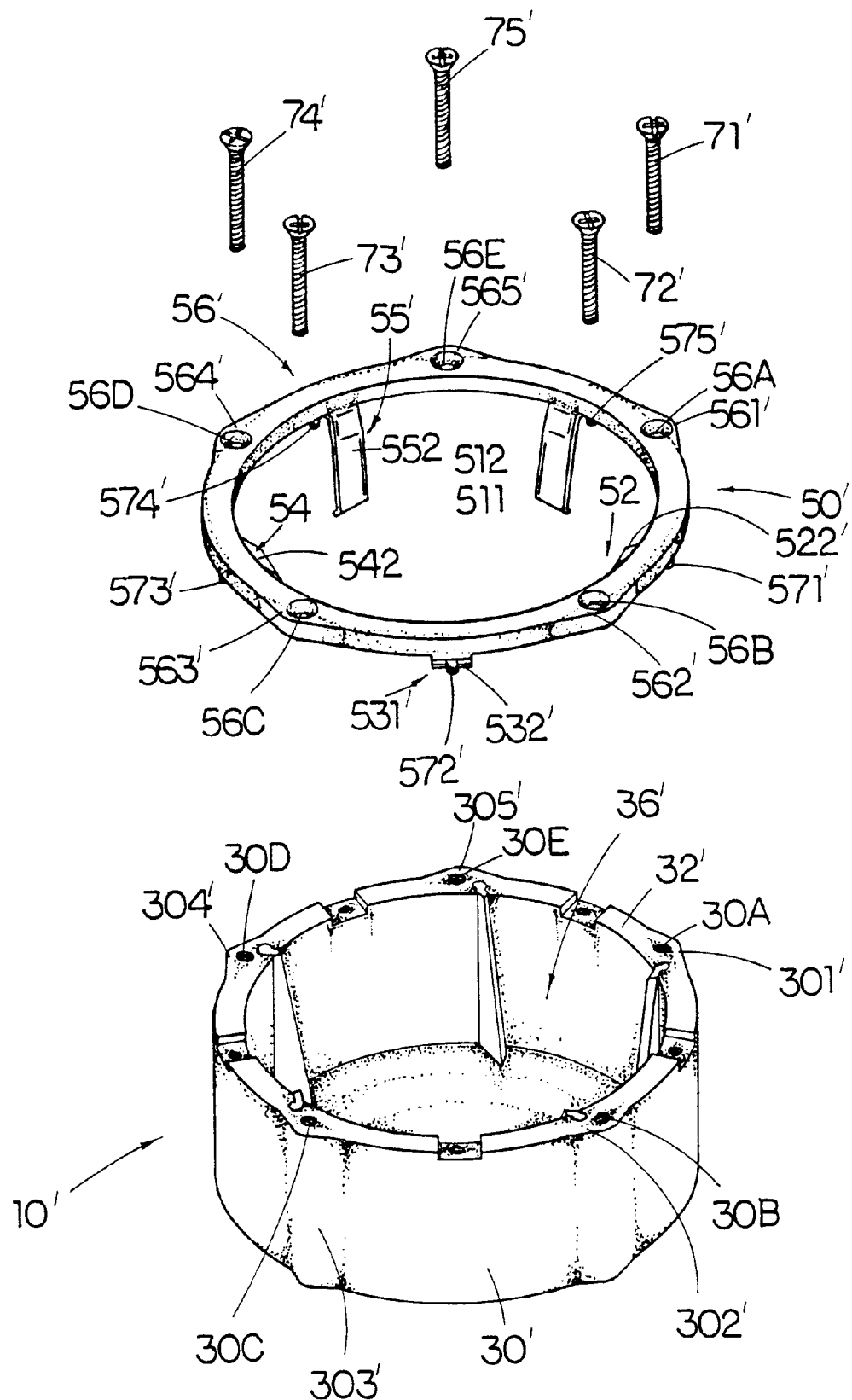
FIG. 7 is an exploded perspective view of an alternative mode of the oil filter wrench according to the above second preferred embodiment of the present invention.

Referring to FIG. 7, an alternative mode of the above second preferred embodiment is illustrated, in which the holder 56' is modified to have the five clipper elements 512', 522', 532', 542', 552' of the five clipping guiders 51', 52', 53', 54', 55' integrally and spaced intervally extended from a bottom side surface of the ring shaped holder 56'. The five affixing plugs 571', 572', 573', 574', 575' are integrally and spaced intervally extending downwards from the bottom side surface of the holder 56', each positioning between each two adjacent securing wings 561' to 565' respectively.

Therefore, by inserting the five affixing plugs 571' to 575' into the five affixing holes 32*a* to 32*e* respectively, the holder 56' can be mounted on top of the wrench body 30'. After respectively screwing the five securing screws 71' to 75' through the five countersink holes 56*a* to 56*e* of the holder 56' into the five screw holes 30*a* to 30*e* on the five body projections 301' to 305' of the wrench body 30', the holder 56' is firmly secured to the top end 32' of the wrench body 30' and the five clipping guiders 51' to 55' are retained within the interior chamber 36'.

Accordingly, any person skilled in art may easily modified the above first and second embodiments to other similar configurations having equivalent functions, such as the wrench body can be modified to ring shaped and the supporting base can also be modified as a supporting bar integrally affixed to the bottom end of the wrench body. Therefore, the scope of the present invention should not be limited to the above disclosed embodiments and should be determined by the claims recited hereafter.

I claim:

1. An oil filter wrench, comprising a hollow wrench body which has a receiving opening provided at a top end thereof, an inner round base wall provided above a bottom end thereof, and a supporting base provided at said bottom end thereof, so as to define an interior chamber between said top end and said bottom end of said wrench body for receiving a lower portion of an oil filter therein through said receiving opening;

a locking device provided on said base wall for interlocking with a circular bottom edge of said oil filter when said oil filter wrench is turned in a unscrewing direction, wherein said locking device comprises a plurality of triangular locking blades intervally protruded from said base wall to said interior chamber of said wrench body in evenly and circularly spaced manner, each of said locking blades being extended from said base wall towards another adjacent of said locking blades in clockwise direction and having a tapered and angular engaging edge extending inclinedly and inwardly towards said bottom end of said wrench body, thereby when said oil filter is received in said interior chamber of said wrench body, said circular bottom edge of said oil filter is rested on said engaging edges of said locking blades which are bitten into said bottom edge of said oil filter while said wrench body is rotated in a direction to unscrew said oil filter, so as to enable said oil filter wrench interlocking with said oil filter during unscrewing rotation; and a driving device integrally provided on said supporting base for driving said wrench body to rotate.

2. An oil filter wrench, as recited in claim 1, wherein said supporting base has a concave inner surface to fit a convex bottom of said oil filter.

3. An oil filter wrench, as recited in claim 2, wherein said wrench body is a hollow cylindrical body made of durable metal and having a predetermined height substantially at least equal to a height of said lower portion of said oil filter, said supporting base being a concave bottom wall of said wrench body, said interior chamber being a circular chamber having a diameter larger than said oil filter.

4. An oil filter wrench, as recited in claim 1, wherein said base wall provides a plurality of evenly and circularly spaced longitudinal engaging grooves in angularly manner, and that each of said locking blades comprises a mounting tail extended outwardly to rigidly and firmly engage in said respective engaging groove.

5. An oil filter wrench, as recited in claim 4, wherein each of said mounting tails of each of said locking blades further provides at least a lateral engaging hole for a constructive material of said wrench body to fill through during molding, so as to integrally and rigidly secure said locking blades in position.

6. An oil filter wrench, as recited in claim 4, further comprising a holding device mounted on said top end for gripping on a round body of said oil filter so as to ensure said oil filter wrench mounting on said oil filter, wherein said holding device comprises at least two clipping guiders intervally extending upwardly from said top end of said wrench body for guiding said wrench body to mount on said oil filter and holding said wrench body in position by clipping on a round body of said oil filter.

7. An oil filter wrench, as recited in claim 6, wherein each of said clipping guiders is an elastic strip which comprises a vertical bottom portion integrally implanted within said top end of said wrench body, a clipping portion extending upwardly from said bottom portion and bending inwardly towards said center of said wrench body, and a guiding portion extending upwardly, outwardly and inclinedly from said clipping portion for guiding said oil filter wrench to mount on said oil filter, whereby when said oil filter is inserted into said interior chamber of said wrench body, each of said clipping guiders is propped up by said oil filter, so that each of said clipping portions is oppositely pressed and clipped on said round body of said oil filter in order to firmly hold said oil filter in position.

8. An oil filter wrench, as recited in claim 7, wherein said driving device comprises a hexagonal head protruding downwardly and coaxially from said supporting base for enabling a corresponding hexagonal socket wrench mounted thereon, and that said hexagonal head has a central square socket provided longitudinally.

9. An oil filter wrench, as recited in claim 1, wherein said base wall provides a plurality of evenly and circularly spaced longitudinal engaging grooves in angularly manner, and that each of said locking blades comprises an enlarged mounting tail extended outwardly to rigidly and firmly engage in said respective engaging groove.

10. An oil filter wrench, as recited in claim 9, further comprising a holding device mounted on said top end for gripping on a round body of said oil filter so as to ensure said oil filter wrench mounting on said oil filter, wherein said holding device comprises a plurality of clipping guiders evenly and intervally mounted on said top end of said wrench body, wherein each of said clipping guiders has a clipper element extending downwardly and inwardly from said top end into said interior chamber of said wrench body for guiding said wrench body to mount on said oil filter and holding said wrench body in position by clipping on a round body of said oil filter.

11. An oil filter wrench, as recited in claim 10, wherein said holding device further comprises a ring-shaped holder having said plurality of clipping guiders extending downwardly therefrom, said holder being fastened to said top end of said wrench body to press and lock said mounting tails of said plurality of locking blades inside said plurality of engaging grooves respectively for firmly securing said plurality of locking blades in position.

12. An oil filter wrench, as recited in claim 11, wherein said wrench body provides a plurality of intervally, outwardly and axially extending body projections to thicken a thickness of said wrench body adjacent said engaging grooves, wherein each of said body projections has a screw hole provided thereon, said holder having a plurality of securing wings intervally protruded from an outer periphery of said holder, wherein each of said securing wings has a countersink hole provided therein, and that a plurality of securing screws are screwed therough said plurality of countersink holes into said plurality of screw holes respectively.

13. An oil filter wrench, as recited in claim 12, in which a plurality of holding recesses are intervally formed on said top end of said wrench body, wherein an affixing hole with a predetermined depth is formed on each of said holding recesses, each of said clipper guiders of said holding device further having a retaining shoulder and each of said clipper elements being extended inwardly and downwardly from said respective retaining shoulder, each of said retaining shoulders further providing a retaining hole thereon, wherein said plurality of retaining shoulders are fittedly positioned in said plurality of holding recess respectively, and that said holer further provides a plurality of affixing plugs integrally and intervally extending downwards from a bottom surface thereof for inserting through said plurality of retaining holes into said plurality of affixing holes respectively to firmly hold said plurality of clipping guiders in position.

14. An oil filter wrench, as recited in claim 11, wherein said driving device comprises a hexagonal head protruding downwardly and coaxially from said supporting base for enabling a corresponding hexagonal socket wrench mounted thereon.

15. An oil filter wrench, as recited in claim 14, wherein said hexagonal head has a central square socket provided longitudinally.

16. An oil filter wrench, as recited in claim 13, wherein said driving device comprises a hexagonal head protruding downwardly and coaxially from said supporting base for enabling a corresponding hexagonal socket wrench mounted thereon, and that said hexagonal head has a central square socket provided longitudinally.

\* \* \* \* \*